UNITED STATES PATENT OFFICE.

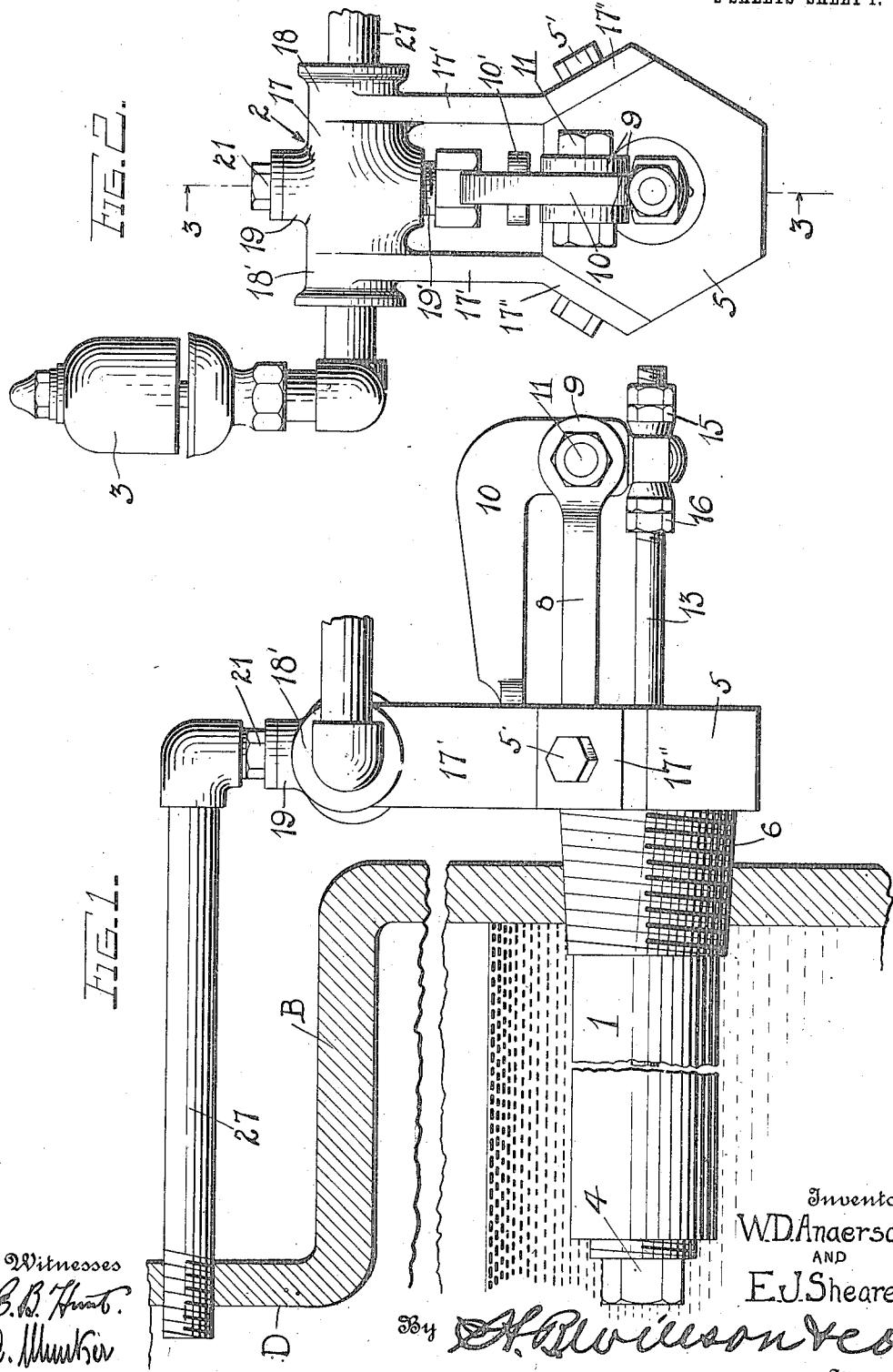

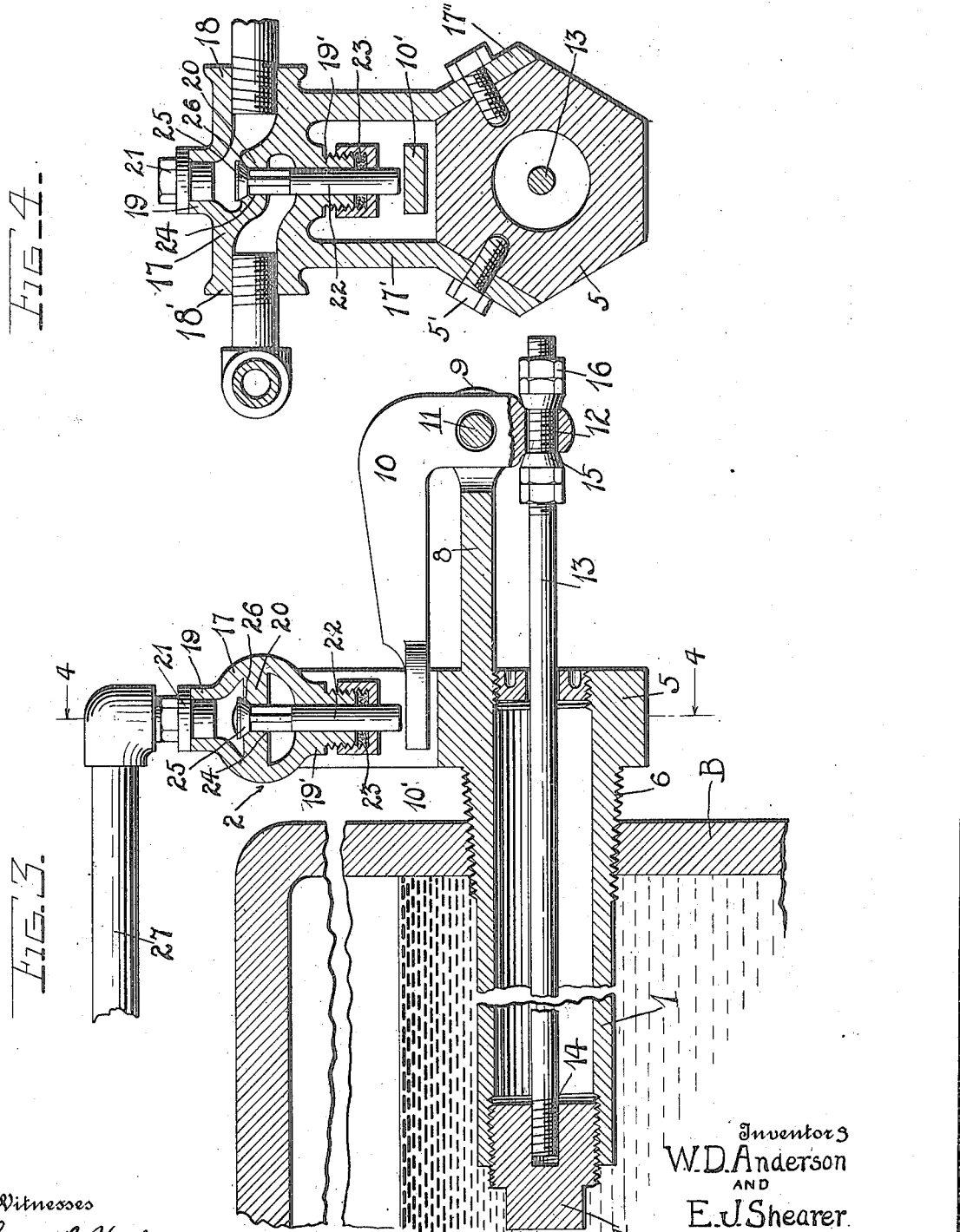

WILLIAMSON D. ANDERSON, OF EL PASO, TEXAS, AND EDWARD J. SHEARER, OF LORDSBURG, NEW MEXICO.

LOW-WATER ALARM FOR BOILERS.

1,123,831.   Specification of Letters Patent.   Patented Jan. 5, 1915.

Application filed March 26, 1914. Serial No. 327,512.

*To all whom it may concern:*

Be it known that we, WILLIAMSON D. ANDERSON, a citizen of the United States, residing at El Paso, in the county of El Paso, State of Texas, and EDWARD J. SHEARER, a citizen of the United States, residing at Lordsburg, in the county of Grant and State of New Mexico, have invented certain new and useful Improvements in Low-Water Alarms for Boilers; and we do declare the following to be a full, clear, and exact description of the invention, such as will enable others skilled in the art to which it appertains to make and use the same.

Our invention relates to improvements in low water alarms for steam boilers and more particularly to those which are operated by the heat from the steam in the boiler, after the water therein has fallen below a predetermined danger point.

The primary object of the invention is to simplify devices of this character and yet to provide an extremely efficient and durable alarm.

A secondary object is to construct the device in such a manner as to cause the necessity of but one opening for its application to a boiler.

With the above and other minor objects in view, the invention resides in certain novel features of construction and combination herein described and claimed and shown in the drawings wherein:

Figure 1 is a vertical longitudinal section through a portion of a boiler showing a side elevation of our invention applied thereto; Fig. 2 is an end view of the parts illustrated in Fig. 1; Fig. 3 is a vertical longitudinal section on the line 3—3 of Fig. 2; and Fig. 4 is a transverse vertical section taken on the line 4—4 of Fig. 3.

In carrying out our invention we employ a thermal tube 1, a steam controlling valve 2, a whistle 3 and mechanism for operating said valve to sound the whistle, when the water level within the boiler, lowers beyond a predetermined danger point.

The thermal tube 1 is of any suitable length and is open at both of its ends, its inner end being internally threaded for the reception of a screw plug 4 while its outer end is provided with a polygonal head 5 and with a plurality of screw threads 6, the portion of said tube on which the threads are formed, being gradually enlarged. Projecting rearwardly from the polygonal portion 5, is an arm 8 which is bifurcated at its outer end to provide a pair of ears 9 between which, a bell crank lever 10 is pivoted upon a transverse bolt 11. The upright arm of said bell crank lever, is preferably shorter than the horizontal arm thereof and is provided through its lower end with an opening 12 which stands in alinement with the center of the tube 1 and is adapted for the reception of the outer end of a rod 13 which passes loosely through the sleeve 1 and has its inner end 14 secured within a threaded socket formed in the inner end of the plug 4. The outer end of the rod 12 is threaded for the reception of cone-shaped bearing nuts 15 and lock nuts 16, one bearing nut and one lock nut being disposed at each end of the opening 12. It may here be stated that the outer end of the rod 13 passes loosely through the opening 12, the necessity of this loose connection becoming apparent in the following description.

Supported above the head 5 of the tube 1, is a valve casing 17 which is provided with laterally extending bosses 18 and 18' and with vertically extending bosses 19 and 19'. The bosses 18 and 18' communicate with the interior of the casing 17 above and below a horizontal partition 20 therein. The bosses 19 and 19' also communicate with the interior of said casing, the opening through the boss 19 being normally closed by a screw cap 21, while the opening within the boss 19' is provided for the reception of an upright valve stem 22 which projects loosely through a stuffing box 23 on said boss 19'. The upper end of the valve stem 22 projects loosely through an upright opening 24 in the partition 20 and is provided with a substantially cone-shaped valve 25, said valve being normally seated upon a seat 26 formed by beveling the upper face of the partition 20 around the circumference of the opening 24. The lower end of the valve stem 22 is disposed slightly above the free end 10' of the horizontal arm of the bell crank lever 10. The opening through the boss 18, communicating with the upper portion of the valve casing 17, communicates through a pipe 27 with the steam dome D of the boiler B while the bore through the boss 18' communicates with the interior of the whistle 3.

As clearly shown in Figs. 1 and 3 of the drawings, the threads 6 are engaged with a threaded opening formed in the rear end of the boiler B and the tube 1 projects into said boiler below the normal water line thereof. This tube may be disposed at the low water or danger point within the boiler or slightly above said point, the latter position being preferable since a signal will be sounded, before the water within the boiler actually reaches a dangerous level. When the parts are in the above described position, and the pipe 27 is connected to the steam dome, as hereinbefore described, all of the parts will remain inactive as long as the water level within the boiler is maintained at a level above the tube 1. When however, said water level drops below the tube 1, the steam above the water, being of greater temperature than the water itself, will expand and lengthen the thermal tube 1. This action will cause the plug 4 and the rod 13 to travel inwardly, thus moving the lower end of its horizontal arm upwardly into contact with the lower end of the valve stem 22. This action will raise said stem and thereby unseat the valve 25, thus allowing the live steam to pass through the opening 24 and into the whistle 3 from which it will be exhausted, thereby sounding said whistle and giving the signal that the water level within the boiler is descending toward the danger point.

It may here be stated that the valve casing 17 may be supported in any desired manner but we preferably provide the same with a pair of depending legs 17', said legs having their lower ends formed into angular feet 17", the latter being adapted for attachment to the polygonal head 5 by means of screws 5' or other suitable fastenings. By so arranging the various parts, it will be seen that they may be readily disassembled for obvious purposes.

From the foregoing description, taken in connection with the accompanying drawings, it will be seen that we have produced an extremely simple yet efficient alarm which will be absolutely positive in its operation.

We have described our invention as applied to the rear end of a boiler, but we do not wish to be limited to this application since it would operate to equal advantage were it applied to one side of a boiler.

Various changes as to form, proportion, material and other minor details may be resorted to without departing from the spirit of the invention as claimed. However all parts are preferably of brass since this material is readily adaptable to this use on account of its non-corrosive qualities.

Having thus described our invention, what we claim as new and desire to secure by Letters Patent is;

A low water alarm comprising a thermal tube having external screw threads intermediate its ends, a polygonal head formed integrally with the outer end of said tube, a longitudinally extending arm formed integrally with said head and having its free end bifurcated, a valve casing spaced above said head, spaced vertical legs depending from said casing and having angularly offset attaching feet contacting with two of the angular surfaces of said polygonal head, fastened elements passing through said feet and into said head, an inlet and an outlet for said casing, a valve controlling communication between the two, and having a vertically slidable stem terminating above said head, a bell crank lever pivoted adjacent its angle to said bifurcated end of said arm, and having one of its arms elongated and positioned between said legs and beneath said valve stem, the remaining arm of said lever depending from its pivot and having an opening alined with the bore of said thermal tube, an externally threaded plug closing the inner end of said tube, a connecting rod located in said tube and having its inner end threaded into said plug, its outer end passing through the opening in the depending arm of said bell crank, external screw threads on said outer end of the rod, and cone and lock nuts on said threads, said cone nuts contacting with said depending arm on the lever at opposite ends of the opening therein.

In testimony whereof we have hereunto set our hands in presence of two subscribing witnesses.

WILLIAMSON D. ANDERSON.
EDWARD J. SHEARER.

Witnesses to the signature of Williamson D. Anderson:
GRANT MARTIN,
ROBERT PIATT.

Witnesses to the signature of Edward J. Shearer:
J. A. NICHOLSON,
ROBERT M. REYNOLDS.